United States Patent
Satanassi

(10) Patent No.: US 11,945,738 B2
(45) Date of Patent: Apr. 2, 2024

(54) UNIT FOR EXTEMPORANEOUS GENERATION OF A PHYSIOLOGICAL OR ISOTONIC SOLUTION BASED ON WATER

(71) Applicant: David Satanassi, Mercato Saraceno (IT)

(72) Inventor: David Satanassi, Mercato Saraceno (IT)

( * ) Notice: Subject to any disclaimer, the term of this patent is extended or adjusted under 35 U.S.C. 154(b) by 652 days.

(21) Appl. No.: 16/613,001

(22) PCT Filed: May 15, 2018

(86) PCT No.: PCT/IB2018/053373
§ 371 (c)(1),
(2) Date: Nov. 12, 2019

(87) PCT Pub. No.: WO2018/211412
PCT Pub. Date: Nov. 22, 2018

(65) Prior Publication Data
US 2020/0172416 A1 Jun. 4, 2020

(30) Foreign Application Priority Data

May 15, 2017 (IT) .................. 102017000052521

(51) Int. Cl.
*C02F 1/68* (2023.01)
*B01F 21/00* (2022.01)
(Continued)

(52) U.S. Cl.
CPC .............. *C02F 1/685* (2013.01); *B01F 21/30* (2022.01); *C02F 1/008* (2013.01);
(Continued)

(58) Field of Classification Search
None
See application file for complete search history.

(56) References Cited

U.S. PATENT DOCUMENTS

2002/0036174 A1* 3/2002 Kawaguichi ............ B09C 1/002
    210/748.13
2007/0207053 A1 9/2007 Doyle et al.
(Continued)

FOREIGN PATENT DOCUMENTS

DE 102005049951 A1 4/2007
JP H0624733 U 4/1994
(Continued)

OTHER PUBLICATIONS

ISR for PCT/IB2018/05337, mailed Jul. 10, 2018.

*Primary Examiner* — Richard C Gurtowski
(74) *Attorney, Agent, or Firm* — Schott, P.C.

(57) ABSTRACT

Unit for extemporaneous generation of a quantity, variable on request, of a physiological or isotonic solution based on water, including: —at least one choice interface for allowing the user to set a desired quantity of solution to be generated from a plurality of possible quantities; —at least one water purification station that receives water from outside the unit and to purify it, —a manner of supplying (25) at least one solute, —at least one mixing station (20) that mixes the purified water with the at least one solute so as to form the desired solution; —management system including a calculation system communicating with the interface for calculating the quantity of purified water and the quantity of solute to be mixed for producing the quantity of solution set by the user.

12 Claims, 1 Drawing Sheet

(51) Int. Cl.
*C02F 1/00* (2023.01)
*B01F 101/48* (2022.01)
*C02F 1/04* (2023.01)
*C02F 1/32* (2023.01)
*C02F 103/08* (2006.01)

(52) U.S. Cl.
CPC ........... *B01F 2101/48* (2022.01); *C02F 1/001* (2013.01); *C02F 1/04* (2013.01); *C02F 1/325* (2013.01); *C02F 2103/08* (2013.01); *C02F 2303/04* (2013.01)

(56) References Cited

U.S. PATENT DOCUMENTS

2012/0043269 A1    2/2012    Shariff et al.
2017/0079461 A1    3/2017    Lipton et al.

FOREIGN PATENT DOCUMENTS

| | | |
|---|---|---|
| JP | 2005046723 A | 2/2005 |
| JP | 2005281238 A | 10/2005 |
| KR | 20060112378 A | 11/2006 |
| RU | 2424181 C2 | 7/2011 |
| RU | 2530373 C2 | 10/2014 |
| WO | 2016181748 A | 11/2016 |
| WO | 2016181748 A1 | 11/2016 |

* cited by examiner

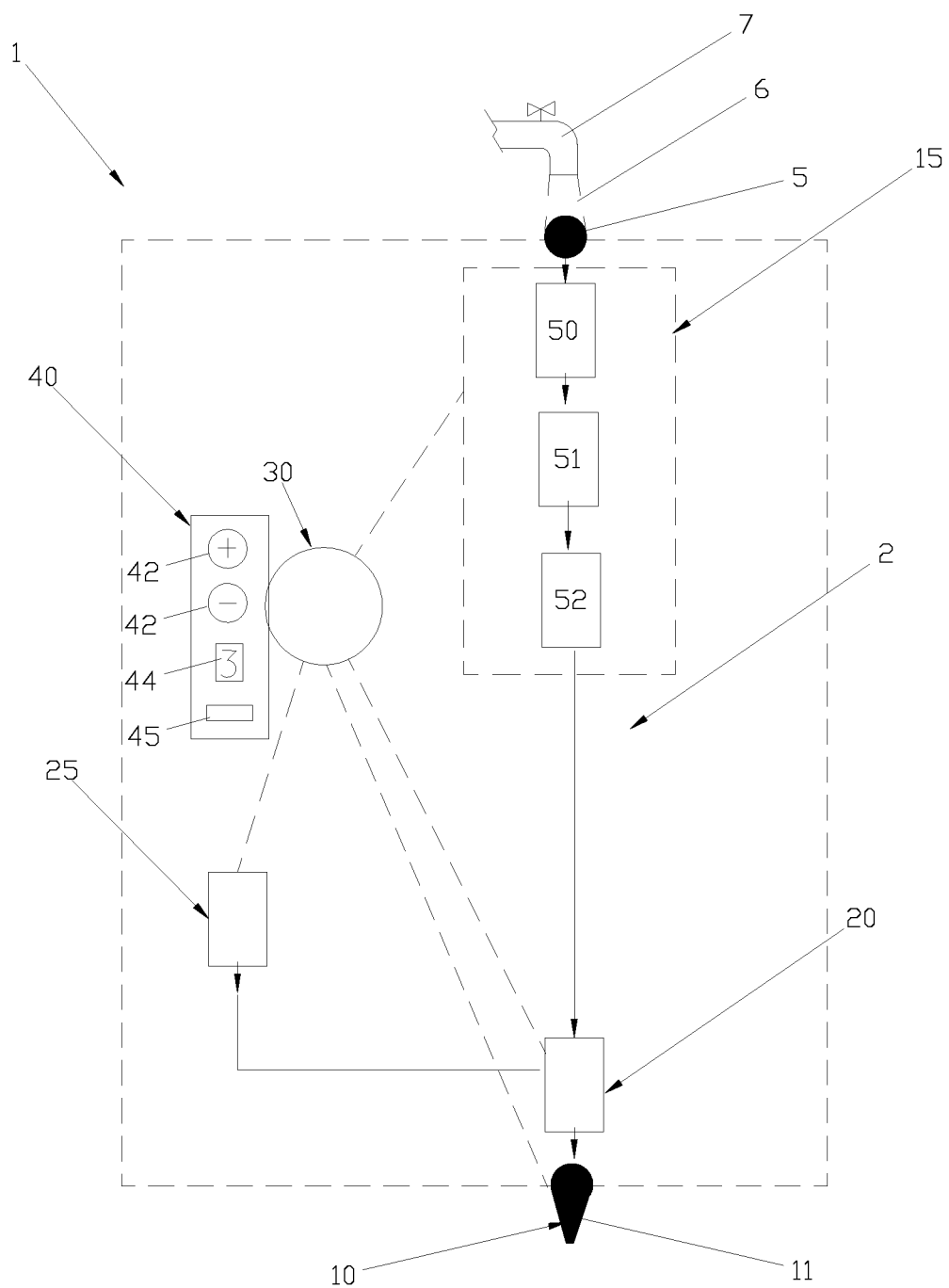

UNIT FOR EXTEMPORANEOUS GENERATION OF A PHYSIOLOGICAL OR ISOTONIC SOLUTION BASED ON WATER

The present invention relates to a unit for extemporaneous generation of a quantity, variable on request, of a physiological or isotonic solution based on water. The invention also relates to a related production process. It is not excluded that the invention can also produce solutions at other concentrations. The solute preferably comprises NaCl (sodium chloride).

The invention is particularly useful for obtaining physiological water to be used for example through intravenous, subcutaneous, intradermal or muscular administration, and electrolytic solutions for oral or parenteral use, to be used as supplements such as, for example, isotonic solutions. It is not excluded that the invention could additionally allow other solutions to be obtained.

Physiological water means the known solution comprising only pure and sterile water and NaCl.

Physiological concentration means the known concentration of NaCl that is generally about 0.9%, save tolerances compatible with the concentrations of the human organism.

Isotonic concentration means the known concentration of NaCl characteristic of cell cytoplasm or the intracellular space save compatible tolerances.

In the healthcare sector the use of physiological water and isotonic solutions is very widespread, which are only available for consumption in industrially prepared predetermined packages.

This makes them difficult to have available in disadvantaged areas of the world where it is difficult to deliver industrial products or to store them in the necessary quantities.

Furthermore, this practice generates waste of physiological water if the quantity to be used is lower than the quantity contained in one or more packages.

It is also to be noted that all the liquid products are subject to an expiry date, therefore after a certain period they are to be disposed of even if they have not been used.

Finally, the energy consumed in the packaging and transport process, and the pollution resulting from the disposal of empty containers, are an aggravating circumstance of the current management system.

Besides, the industrial systems used in the production of packaged solutions are not adapted for the realisation of devices for making solutions on request and in the necessary quantity. In fact, in general for physiological solution they provide to prepare a predefined quantity of pure water and always to combine it with a same predetermined quantity of solute (NaCl) for generating a predetermined quantity of physiological solution that is stored in a tank from which it is gradually derived for being packaged. It is clear that the dimensions of the tanks do not allow devices to be realised that are suitable for use in places of consumption such as hospitals, clinics, surgeries, field hospitals, areas of conflict or of health emergencies etc.

A device is known from German patent application 102005049951 for realising physiological solutions for rinsing, of the type used by dentists for mouth washes. Such device is able to produce physiological rinsing solutions on request, but always in the same quantity as itself, and it envisages a drain for the excess product. Furthermore, such device sterilises the solution after it has been made, which in general implies heating and degassing, which can alter the concentration obtained.

In the medical sector, so-called Quinton's Plasma, or isotonic sea water, is also known, and attracts particular interest. The device of 102005049951 is not able to realise this particular solution, since it is not able to use sea water as a solute and in particular is not able to preserve its probiotic bacterial forms because of the sterilisation.

Therefore, there remains a latent need in the sector for a device that allows the quantity of physiological solution produced to be varied on request, and that leaves open the possibility to realise other solutions such as Quinton's Plasma, without limiting the efficacy thereof.

A general object of the present invention is that of completely or partly solving the problems of the prior art.

A preferred object of the present invention is that of providing a unit for the generation on request of solution of at least physiological and/or isotonic concentration adapted for use in places of consumption, such as hospitals, clinics, surgeries, field hospitals, areas of conflict or health emergencies, etc.

A further preferred object of the present invention is that of providing a unit for the generation of solutions of physiological and/or isotonic concentration of simple and cheap production, and preferably portable.

Another further preferred object of the present invention is that of allowing the generation of solutions of physiological and/or isotonic concentration everywhere and starting from any type of water, preferably also not drinking water.

According to some general aspects, the present invention relates to a generation unit and the related process as defined in the appended claims.

In particular, the following advantages connected thereto are noted.

According to some preferred embodiments, a unit for extemporaneous generation of a quantity, variable on request, of a physiological or isotonic solution based on water according to the present invention is characterised in that it comprises:

- at least one choice interface (40) for allowing the user to set a desired quantity of solution to be generated from a plurality of possible quantities;
- means for supplying purified water comprising at least one water purification station (15) adapted to receive water from outside the unit and to purify it (where purified means pure water, i.e. without salts, save any tolerance for injectable or drinkable solutions, the pure water may be sterilised or non-sterilised)
- means for supplying (25) at least one solute (where solute means a pure salt in supersaturated or hypertonic concentrate, or in solution, such as sea water for example)
- at least one mixing station (20) adapted to mix the purified water with said at least one solute in quantities such as to form a set quantity of solution;
- calculation means communicating with the interface for calculating the quantity of purified water and the quantity of solute to be mixed for producing the quantity of solution set by the user.

Advantageously, there is no waste of the precious element, which is the solute, as it is proposed to produce only the required quantity of solution each time. Furthermore, the water can be sourced and purified in situ directly through the unit.

The management means are preferably in operating communication with the purified water and solute supply means for ordering them to supply to the mixing station said calculated quantities of purified water and solute.

According to some preferred embodiments, the water purification station is ordered by the management means to generate said calculated quantity of purified water after the desired quantity of solution has been set through the interface.

According to some preferred embodiments of the invention, the solute supply means comprise manual insertion means of solutes of various natures into the unit, where the interface means comprise means for setting the nature of solute inserted, and the calculation means comprise means for setting the calculation based on the nature set.

In that case for example the solute supply means comprise a single insertion inlet and a single path of the solute from the inlet to the mixing station, so as to allow the solute to be inserted manually and to set the one inserted on the interface, so that it can be modified at every use—advantageously there is a polyhedral but simple unit. Preferably it is possible to provide means for washing the mixing chamber and the path after every use and/or solute change and/or command.

Alternatively, the supply means have a plurality of inlets for the solute and a plurality of related paths from the inlets to the mixing station, one for each solute that can be set from the interface. Preferably the paths are distinct and separate from each other, so that the related solutes do not come into contact with each other, even more preferably it is possible to provide means for washing the mixing station after every use and/or order.

In general, said nature comprises the form of the solute, and said interface comprises the choice between at least two of the following forms of solute: a salt, a supersaturated or hypertonic concentrate, a predetermined solution, sea water.

It is also possible that said nature comprises the type of solute, where said interface comprises among the solutes that can be set at least rehydrating and nourishing solutes for physiological solution, e.g. for physiological water (where the solute is NaCl), Ringer's lactate or dextrose solution.

According to some preferred embodiments said supply means comprise first supply means for supplying said calculated quantity of solute in the pure and sterile state, and second supply means distinct from the first ones for supplying said calculated quantity of solute in the non-sterile state (e.g. sea water), or alternatively the unit comprises means for washing and sterilising the supply means that can be activated selectively and/or at every solute change and/or after every mixing process.

Advantageously in this way an ambivalent unit is provided for realising both injectable sterile solutions and sterile solutions, such as, for example, Quinton's Plasma, which requires the conservation of probiotic bacterial forms of sea water.

Preferably, the unit comprises management means that control the concentration of the solution to be generated by osmolarity. In this way the concentration of the solution generated is particularly exact, as the check may be based on crossing two items of data, those of a stoichiometric check and those of a pH check (the latter is for example an indication of the dissociation constant). In this way the check is both physical and chemical (e.g. on the number of molecules and on the dissociation constant). The osmolarity check may for example be used to control the mixing duration, which finishes for example when both the number of molecules deriving from the stoichiometric check and the dissociation constant deriving from the pH check have reached a predefined target value.

According to some preferred embodiments of the invention said purification station comprises a water sterilisation station upstream of the mixing station. Advantageously, it is possible to make both Quinton's Plasma and sterile injectable solutions—the sterility of the solute can in fact be controlled manually through the introduction into the unit of sterile solute (salt or concentrates thereof for physiological solution) or non-sterile (sea water for Quinton's Plasma) as required.

Additionally, or alternatively to the sterilisation station upstream of the mixing station, the unit can comprise a sterilisation station downstream of the mixing station, where the station downstream can be activated and deactivated selectively.

These characteristics also advantageously lead to an ambivalent unit for making both sterile injectable solutions and Quinton's Plasma.

A preferred process for extemporaneous generation of a quantity, variable on request, of a physiological or isotonic solution based on water, comprises the steps of:
  providing a unit of the type previously indicated;
  providing software in the unit able to calculate the respective quantities of pure water and at least one solute to be combined to generate a required quantity of solution extemporaneously by a user from a plurality of different quantities that can be generated;
  requesting the generation of said quantity of solution from the unit;
  processing such signal through said software for calculating said quantity of pure water and product to be combined;
  purifying a quantity of water corresponding to the quantity calculated after the request, deriving the water to be purified from outside the unit;
  ordering through said software the combination of the quantity of pure water and product calculated.

According to other general aspects, the present invention relates to a unit for extemporaneous generation of a quantity, variable on request, of a solution comprising at least water and NaCl at least at a physiological and/or isotonic concentration characterised in that it comprises:
  at least one quantity setting interface to allow the user to set a desired quantity of solution to be generated from a plurality of possible quantities (e.g. a quantity expressed in a predetermined unit of measurement, e.g. ml, within a predetermined capacity range of the device, the quantities that can be requested corresponding to the subdivision of the range in values depending on the measurement precision of the device);
  at least one water purification and sterilisation station (15) adapted to receive water from outside the unit and to purify and sterilise it;
  means for supplying (25) at least one product containing at least NaCl in solute or soluble form;
  at least one mixing station (20) downstream of the purification and sterilisation station adapted to mix the purified water and sterilise it with said at least one product for forming the desired solution;
  programmed or programmable management means (30) communicating with the interface able to calculate the quantity of purified and sterilised water and the quantity of product to be mixed for producing the quantity of solution set by the user;
  the management means (30) being connected to the mixing station for ordering them to mix said calculated purified and sterilised water and product.

Advantageously, the unit according to the invention can be used anywhere and with any type of starting water that can be found in situ, therefore it is free from problems related to the storage of material which represents the maximum overall dimensions of the final solution. For this reason, it is also easy to realise in a transportable form. Other advantages are represented by the absence of packaging and the possibility to exactly realise the desired dose.

According to some preferred embodiments of the invention said calculated product is unsterilised sea water, where the supply means are ordered by the management means (30) to dispense said calculated quantity of unsterilised sea water to the mixing means (20).

In this way, advantageously, the invention can be programmed to produce Quinton's Plasma.

Preferably, said supply means comprise at least sea water filtration means, and preferably means for analysing the concentration of NaCl of the sea water used. It is observed that distillation is necessarily excluded, therefore the sea water still comprises the salts. Furthermore, thanks to the absence of sterilisation, the sea water used still comprises the probiotic bacterial forms necessary for obtaining Quinton's Plasma.

It is not excluded that the device comprises other supply means, e.g. in the form of a purification circuit and preferably sterilisation circuit of the sea water, which can be activated or deactivated by choice, to allow the use of sea water, or its salt, in purified and possibly sterile form, for obtaining physiological, preferably sterile, solution. It is also not excluded that there may be supply means able to extract NaCl and/or other salts from the sea water to supply them as solute whose quantity can be calculated.

Therefore, a large part of salts useful as supplements can be advantageously obtained directly from the sea, making the most widespread and available resource of the planet usable. Therefore, the unit can be used in a large part of the globe.

According to some possible embodiments, in addition to or alternatively to the use of sea water it is possible to use pure NaCl and/or in supersaturated or pure hypertonic solution as a product to be combined with the purified water. In that case, for example the supply means comprise a tank of pure NaCl and/or in supersaturated or hypertonic solution and are ordered by the management means to dispense said calculated quantity of NaCl to the mixing means.

Preferably the supply means comprise distinct and separate first and second supply means for supplying pure NaCl, in supersaturated or pure hypertonic solution, and unsterilised sea water, respectively, to the mixing means.

In general, it is preferable for the unit to comprise dispensing means ordered by the management means to dispense the whole extemporaneous quantity of solution requested as soon as it has been generated.

Preferably, the purification and sterilisation station comprises in succession between each other at least one filtration substation, one sterilisation substation and one distillation station.

According to some preferred embodiments, the water purification and sterilisation station can be ordered by the management means to generate purified and sterilised water in variable quantities calculated based on the quantity of solution requested extemporaneously by the user. In this way, no stores of purified water are necessary and the unit is simpler, less bulky and less expensive.

According to some preferred embodiments, the unit comprises an interface for setting the type of solution to be obtained, operatively connected to the management means, where the management means comprise calculation means depending on the type of solution set. For example, the calculation means are automatically set on the type of solution to be calculated based on the type of solution set.

According to another general aspect thereof the invention comprises a process for extemporaneous generation of a quantity, variable on request, of a solution comprising at least water and NaCl at least at a physiological and/or isotonic concentration characterised in that it comprises the steps of:

providing software able to calculate the respective quantities of pure and sterile water of at least one product comprising at least NaCl to be combined to generate a plurality of different quantities from each other of said solution, each corresponding to a quantity requested extemporaneously by a user;

generating based on an extemporaneous request of a user a request signal of a desired quantity of said solution;

processing such signal through said software for calculating said quantity of pure water and product to be combined;

ordering through said software the combination of the quantity of pure water and product calculated.

Preferably, said product comprises NaCl and unsterilised sea water, and the software calculates the quantity of purified water to be used to dilute the calculated quantity of sea water for obtaining a physiological and/or isotonic solution.

The process preferably envisages purifying and sterilising the water before it is mixed with said product.

In addition to or alternatively to the use of sea water said software calculates the quantity of pure NaCl and/or in pure supersaturated or hypertonic solution to be combined with the calculated quantity of pure water for obtaining a physiological solution. In the case in which it is possible to use both NaCl, pure and/or in solution, and sea water, the software chooses which product to use, e.g. based on the type of solution to be obtained. For example, it will use sea water for obtaining isotonic solutions and Quinton's Plasma and pure NaCl and/or in supersaturated or hypertonic solution (where it is preferably the only solute) for obtaining physiological solution. The use of NaCl in supersaturated or hypertonic solution could accelerate the mixing with respect to the use of pure NaCl.

In general, it is observed that the invention preferably obtains the desired concentration of solution (at least physiological or isotonic) by managing the osmolality of the solution, e.g. by calculating the osmolality. It is pointed out that the osmolality is a measurement of the concentration of the solution that represents the number of osmoles of solute per kilogram of solvent.

Further characteristics and advantages of the present invention will become clearer from the following detailed description of the preferred embodiments thereof, with reference to the appended drawings and provided by way of indicative and non-limiting example.

In such drawings:

FIG. 1 schematically represents a unit according to the present invention.

With reference to FIG. 1, a unit for producing a solution containing NaCl in physiological and/or isotonic concentration according to the present invention is shown, where the unit is indicated overall with the reference number 1.

The unit 1 comprises at least one interface 40 configured to allow a user to make a request to the unit 1 for solution in a desired quantity extemporaneously. In the example illustrated, the interface 40 comprises keys 42 for selecting the desired quantity of solution, and a display 44 that shows the quantity of solution to be requested, as well as a key 45 for sending the request, which generates a signal to be processed by the unit, as will be clarified better below.

The unit 1 comprises at least one path 2 along which the water flows through the unit for crossing it from an inlet point 5 to an outlet point 10.

At the inlet point 5 water receiving means 6 are placed for receiving water from outside the unit, e.g. a connection to the domestic water mains 7.

At the outlet point 10 means 11 are placed for dispensing the solution generated by the unit.

Along said path, at least the following are placed in succession:
- a water purification station 15 that can be ordered to purify the water coming from the inlet point in a variable quantity based on the user's request.
- a mixing station 20 for mixing the purified water with a predetermined quantity of at least one product comprising at least NaCl.

The unit further comprises:
means for supplying 25 said product to the mixing station 20, placed in communication with the path downstream of the purification station 15.

The unit 1 also comprises programmed or programmable management means 30 communicating with the interface 40 for receiving said signal and processing it so as to extemporaneously calculate the quantity of purified water and the quantity of at least one product containing at least NaCl for producing the quantity of solution requested extemporaneously by the user, the management means 30 being connected to the purification station 15 for ordering it to purify said calculated quantity of water and transmit it directly to the mixing station 20. The calculation is, for example, an osmolality calculation.

The management means are also connected to the mixing station 20 for ordering it to mix said calculated water and NaCl.

According to a less preferred variant, the purification station comprises a purified water storage tank, and purifies a quantity of water independent from the request, subsequently storing it in the tank, where the management means 30 order to purification station to transfer the calculated quantity of purified water from the tank to the mixing station 20.

In the example illustrated, the mixing station 20 feeds the dispensing means 11, which are ordered by the management means 30 to dispense the solution straight after mixing.

As can be seen, the purification station 15 comprises in succession between each other a filtration substation 50, a sterilisation substation 51 and a distillation substation 52.

For example, the filtration substation 50 comprises at least one from among a physical filter, e.g. membrane, chemical and electrolytic.

The sterilisation substation comprises, for example, at least one source of UVA rays.

We observe at this point that the invention preferably envisages using pure NaCl or in supersaturated or hypertonic solution, preferably sterile and pure (where NaCl is preferably the only solute, save any physiologically acceptable tolerances), as the product to be combined with the purified water, for producing physiological solution, and sterilised sea water for producing isotonic physiological solutions.

In the first case the supply means 25 comprise at least one tank of pure NaCl or in supersaturated or hypertonic solution, in the second case they comprise at least one sea water supply station where filtering can take place, but preferably sterilisation or distillation does not take place.

It is not excluded that the supply means comprise first and second supply means, where the former supply pure NaCl or in supersaturated or hypertonic solution, and the latter unsterilised sea water. Preferably the two means will be distinct and separate from each other.

The supply means 25 may be ordered by the management means 30 extemporaneously to immediately generate the calculated quantity of sea water and to transmit it directly to the mixing station 20, or may comprise a sea water storage and dispensing tank.

It is not excluded that the unit could produce both physiological solution and isotonic solution at physiological concentration in which case the management means are able to order the combination with purified water of pure NaCl or in supersaturated or hypertonic solution or sea water, possibly not sterilised, respectively, in the event that Quinton's Plasma is, for example, to be produced.

It is also not excluded that the unit could be able to realise other types of solution, e.g. with NaCO3 (bicarbonate), in which case the interface means are able to allow the user to choose the desired solution type, the unit is provided with supply means of the necessary solute (pure or in solution), and the software can calculate the quantities of elements to be mixed to obtain the selected solution.

The unit is preferably configured as a single device, preferably portable.

In use, the user requests a desired quantity of solution from the unit extemporaneously through the interface. The latter generates a signal that is processed by software of the management means to calculate the quantity of purified water and product to be combined to generate the requested quantity of solution. The software then orders the purification station to supply the calculated quantity of pure water to the mixing station, and orders the supply means to supply the calculated quantity of product to the mixing station. Then the software orders the mixing station to mix in order to generate the solution and then the dispensing means to dispense it.

Naturally, the embodiments and variants described and illustrated up to now are for purely exemplifying purposes and a person skilled in the art, to satisfy specific and contingent requirements, can make numerous modifications and variants, including for example the combination of said embodiments and variants, all actually contained within the scope of protection of the present invention as defined by the following claims.

The invention claimed is:

1. Unit for extemporaneous generation of a quantity, variable on request, of a solution based on water of a predetermined concentration of at least one solute, comprising:
- at least one choice interface for allowing the user to set a desired quantity of solution to be generated from a plurality of possible quantities;
- purified water supply means comprising at least one water purification station adapted to receive water from outside the unit and to purify the water to create purified water;
- means for supplying at least one solute;
- at least one mixing station adapted to mix the purified water with said at least one solute in quantities such as to form a set quantity of solution; and
- management means comprising calculation means communicating with the at least one choice interface for calculating the quantity of purified water and the quantity of solute to be mixed for producing the quantity of solution set by the user;

wherein management means are in operating communication with the purified water, wherein the means for supplying at least one solute and the management means direct said calculated quantities of purified water and solute to the mixing station;

wherein the management means controls a concentration of the solution to be generated by calculation of osmolarity of the solution, and the management means stops the mixing in the mixing station when both a number of molecules using a stochiometric measure and a dissociation constant using a pH measure reach target values.

2. Unit according to claim 1, wherein the water purification station is ordered by the management means to generate said calculated quantity of purified water after the desired quantity of solution has been set through the at least one choice interface.

3. Unit according to claim 1, wherein the purification station comprises a water sterilization station upstream of the mixing station.

4. Unit according to claim 3, wherein additionally or alternatively to the sterilization station upstream of the mixing station, it the unit comprises a sterilization station downstream of the mixing station, where any stations downstream of the mixing station can be activated and deactivated selectively.

5. Unit according to claim 1, further comprising dispensing means ordered by the management means to dispense the whole quantity of solution as soon as it has been generated.

6. Process for extemporaneous generation of a quantity, variable on request, of a predetermined concentration of at least one solute, the process comprising:
providing a unit according to claim 1;
providing a software in the unit able to calculate quantities of pure water and at least one solute to be combined to generate a required quantity of solution extemporaneously by a user from a plurality of different quantities that can be generated;
requesting the generation of said quantity of solution from the unit;
processing a signal through said software for calculating said quantity of pure water and product to be combined;
purifying a quantity of water corresponding to the quantity calculated after the request, deriving the water to be purified from outside the unit;
ordering through said software the combination of the quantity of pure water and solution calculated;
wherein the management means obtain a desired concentration by osmolality control;
wherein the osmolality control is based on a stoichiometric check and a pH check, wherein the PH check is an indication of the dissociation constant;
wherein the osmolality control is used to control a mixing duration that finishes when both the number of molecules deriving from the stoichiometric check and the dissociation constant deriving from the pH check reach a predefined target value.

7. Process according to claim 6, further comprising purifying and sterilizing the water before the water is mixed with said product.

8. Process according to claim 6, wherein the management means obtain the desired concentration by osmolality control.

9. Process according to claim 6, wherein different solutes are inserted manually into the unit and the solute to be used for the calculation is set.

10. Unit according to claim 1, wherein the solute supply means comprises a purification circuit of sea water, which can be activated or deactivated by choice.

11. Unit according to claim 1, wherein the solute supply means comprise at least sea water filtration means, and means for analysing the concentration of NaCl of sea water used, wherein distillation is necessarily excluded, therefore the sea water still comprises its salts.

12. Process according to claim 6, further comprising the following steps:
manually inserting solutes of various natures into the unit;
setting the nature of solute inserted; and
setting the calculation based on the nature set.

* * * * *